United States Patent [19]
Markling

[11] Patent Number: 5,824,960
[45] Date of Patent: Oct. 20, 1998

[54] RETRACTABLE TRAILER WIRE HARNESS

[76] Inventor: Floyd F. Markling, 3538 Caya Largo Ct., Punta Gorda, Fla. 33950

[21] Appl. No.: 832,054

[22] Filed: Apr. 2, 1997

[51] Int. Cl.[6] .................................................... H02G 11/00
[52] U.S. Cl. ............................................................ 174/135
[58] Field of Search ................................ 174/135; 248/51

[56] References Cited

U.S. PATENT DOCUMENTS

| | | | |
|---|---|---|---|
| 992,821 | 5/1911 | Stewart | 174/135 |
| 2,049,410 | 7/1936 | Diehl | 248/51 |
| 2,144,272 | 1/1939 | Ray | 248/51 |
| 2,215,292 | 9/1940 | Koscierzyna | 248/51 |
| 2,250,042 | 7/1941 | Sundt et al. | 174/135 |
| 2,472,244 | 6/1949 | Brady | 38/107 |
| 3,800,068 | 3/1974 | Torgerson | 174/135 |
| 5,068,496 | 11/1991 | Favarola | 174/65 R |

FOREIGN PATENT DOCUMENTS 2702100  2/1993  France .................................... 174/135

Primary Examiner—Kristine L. Kincaid
Assistant Examiner—Joseph Waks
Attorney, Agent, or Firm—D. L. Tschida

[57] ABSTRACT

A resilient wire harness for supporting a number of conductors at a towed trailer. The conductors are supported within a bushing and a spiral wound spring that extends from a trailer tongue. A loop at one end of the spring secures the spring and bushing to the trailer. A slack end of the conductor is wrapped through a loop at the other spring end to provide stretch relief.

13 Claims, 3 Drawing Sheets

RETRACTABLE TRAILER WIRE HARNESS

BACKGROUND OF THE INVENTION

The present invention relates to a wire support harness and, in particular, to a spiral wound spring assembly which resiliently supports a number of trailer lighting conductors and a terminal end to displace the conductors and prevent damaging the conductors upon detachment of the terminal end from a towing vehicle.

A problem frequently encountered by those who trailer boats, personal recreational vehicles e.g. snowmobiles, four wheelers, personal watercraft, or camping trailers is that of crushing or damaging the terminal end of the tail light conductors that are strung through the trailer frame. In particular, with the detachment of the terminal end from the vehicle connector, the wires hang loose from the tongue end to drag on the ground and are frequently damaged with subsequent movement of the trailer. Alternatively, the wires can be stretched when a detached trailer is moved or allowed to fall to the ground, before the wires are detached from the vehicle.

A variety of techniques have been developed to address the problem of damaging loose conductors. Conductors shown at U.S. Pat. Nos. 3,538,484; 3,993,860; 4,061,407; 4,846,697 and 4,988,833 are coated with insulative materials having memories. The coated coverings are wound in coils and the coiled conductors are able to stretch and spring back to shape to minimize slack. Retainer straps have also been secured to trailer conductors to secure slack portions, reference U.S. Pat. No. 4,846,697.

U.S. Pat. No. 5,129,828 also discloses a retractable harness having a spring biased take-up mechanism that attaches to a cable and retracts the cable when released from a towing vehicle. The housing is constructed to mount beneath a trailer ball. The housing and take-up assembly, however, are rather costly and susceptible to damage and collection of dirt, water and the like during normal trailering operations.

To overcome the foregoing deficiencies and provide an efficient low cost solution, the harness of the invention was designed to resiliently support the conductors and provide stretch relief when connected to the vehicle. With the detachment of the harness connector from the vehicle, the harness springs to an erect position and supports the conductors in a condition where they are out of the way and cannot be crushed.

SUMMARY OF THE INVENTION

It is a primary object of the invention to provide a harness for resiliently supporting and retracting electrical conductors which mount between towed vehicles.

It is a further object of the invention to provide a spiral wound spring harness which contains the conductors to prevent abrasion and provide stretch relief at a trailer connection.

It is a further object of the invention to provide a spring harness having an integral trailer frame attachment coupler.

It is a further object of the invention to provide a spring harness having an integral stretch relief fitting.

Various of the foregoing objects, advantages and distinctions of the invention are obtained in a presently preferred harness construction having a spiral wound spring that includes projecting, looped restraints and mounts to a supporting bushing. The bushing mounts to a trailer frame member and the spring is fitted over the bushing. A loop at the spring is secured to the trailer member and retains the spring and bushing to the trailer. A loop at the opposite end of the spring retains a length of slack conductor to prevent stretching or pulling of the conductors from the harness, for example, if the connector is inadvertently not disconnected when the trailer is detached from a towing vehicle.

Still other objects, advantages and distinctions of the invention, as well as other constructions are more apparent at the following description with respect to the appended drawings. To the extent similar structure appears at the drawings, it is identified with similar reference characters or numerals. Various considered modifications and improvements are also described as appropriate. The scope of the invention should not be literally construed nor limited by the disclosed constructions. Rather, the invention should be interpreted to include all those equivalent constructions within the scope of the further amended claims.

DESCRIPTION OF THE PREFERRED EMBODIMENT

Figure 1:
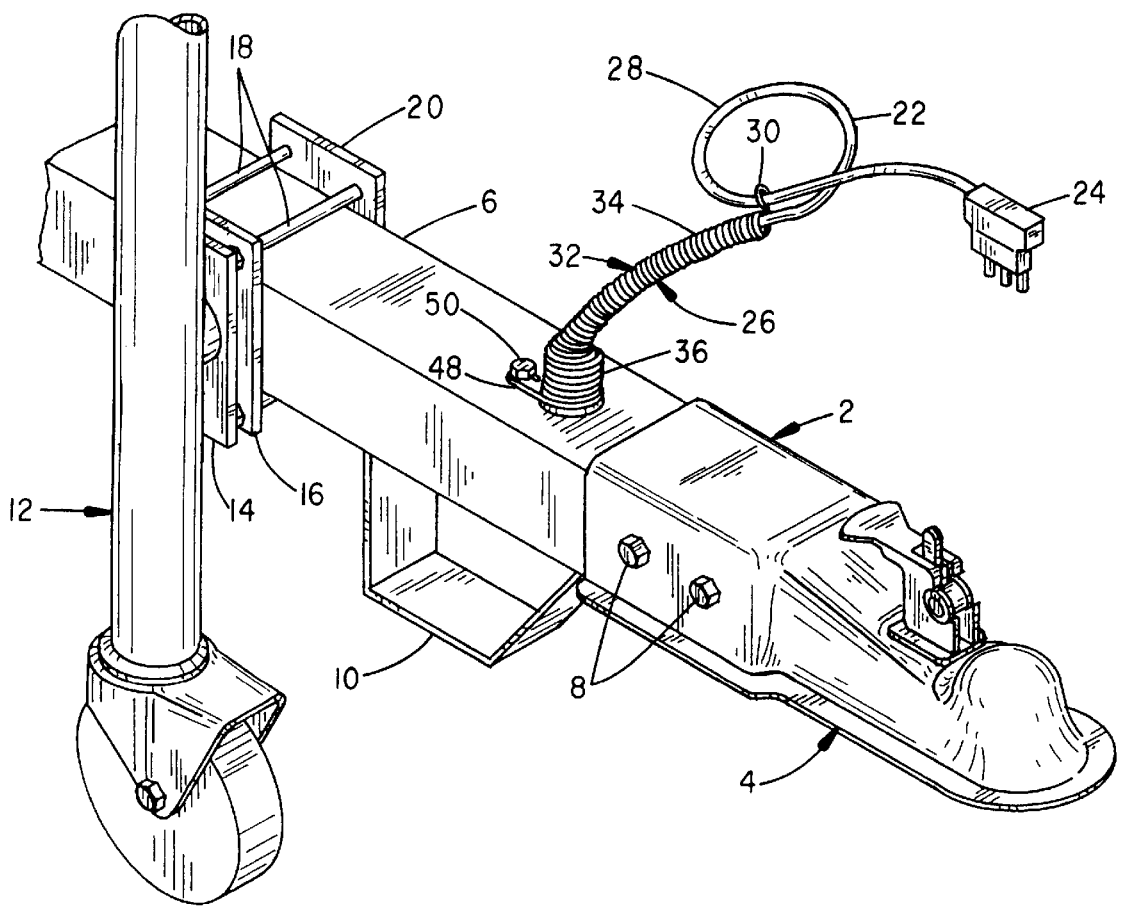
FIG. 1 is a perspective drawing shown in partial section to the tongue of a typical trailer, such as a boat trailer.

With attention to FIG. 1 a perspective drawing is shown to the tongue end 2 of a typical trailer. A conventional ball coupler 4 is secured to a tubular trailer frame member 6 with a number of bolt and nut fasteners 8. A skid plate 10 depends from the frame member 6 and a tongue jack 12 swivels at a pair of mating plates 14 and 16. The skid plate 10 prevents the ball coupler 4 from contacting the ground, such as if the tongue is accidentally dropped. The jack 12 facilitates attachment of the trailer to a towing vehicle and movement of the trailer when disconnected. The jack 12 is secured to the frame member 6 with fasteners 18 that extend to a plate 20 fitted to an opposite side of the member 6.

Projecting from a hole in the frame member 6 is a multi-wire conductor 22 and terminal connector 24. The conductor 22 extends from a resilient harness 26 and is supported at an end retainer 30. The resilience of the harness 26 provides strain relief and assures the conductor 22 is supported away from possible damage. A loop 28 of slack conductor 22 is secured to the retainer 30 to separately provide stretch relief, if the connector 24 is inadvertently not disconnected from a mating fitting (not shown) at a towing vehicle.

The conductor 22 extends through a bore 31 of a spiral wound, harness body or spring 32 having upper and lower winding sections 34 and 36. The wound construction of the body 32 permits the body 32 to flex with conductor movement. The upper section 34 exhibits a bore diameter of ⅜ to ⅝ inches and the lower section 36 exhibits a diameter of ⅝ to ¾ inches. The increased diameter of the lower section 36 allows the section 36 to mount over a bushing 38 that is fitted to the frame member 6, reference FIG. 2.

The diameter differential and resilience of the material provides a preferential point of resilience and causes the section 34 to flex from a horizontal, mounted condition to an erect condition, upon detachment of the terminal connector 24. The conductor 22 is then supported above the ground. The diameters of the sections 34 and 36 can be adjusted as appropriate to provide a desired resilience and accommodate the diameters of the conductor 22 and the bushing 38.

Figure 2:
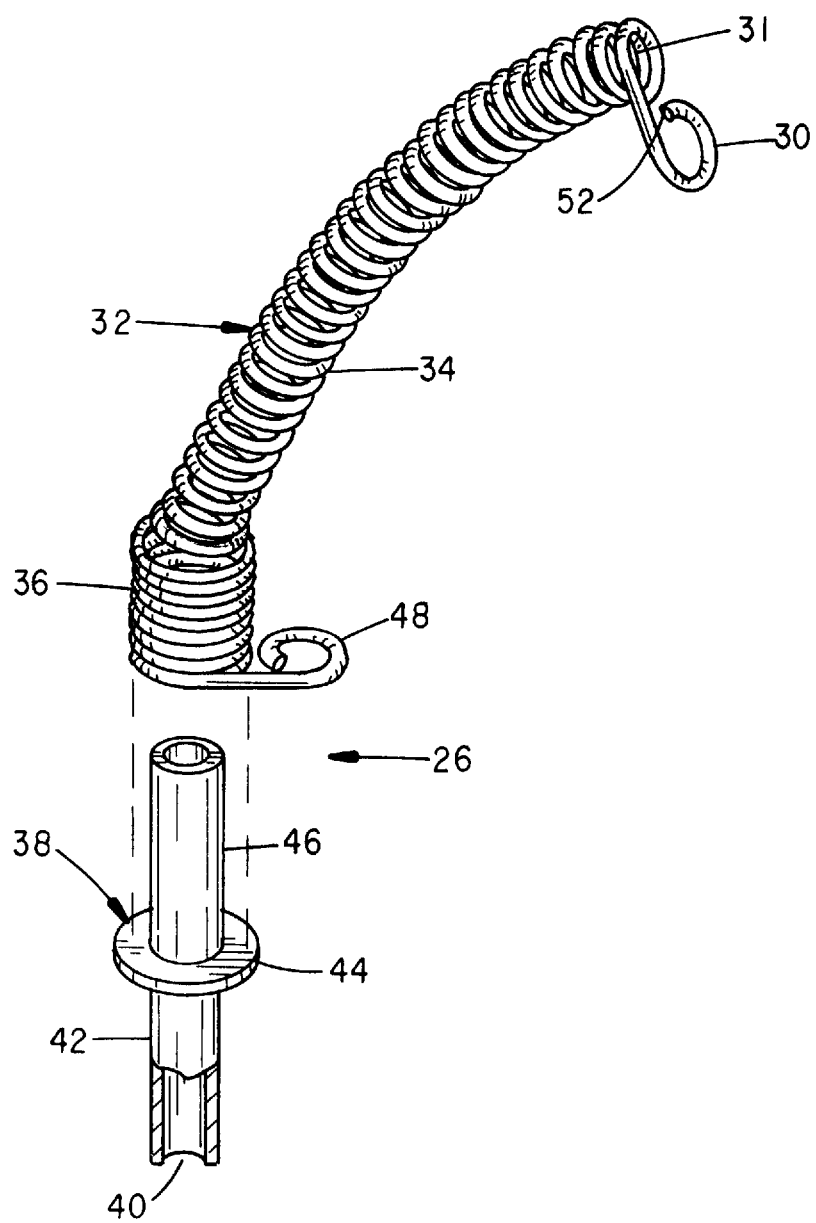
FIG. 2 is a perspective drawing shown in exploded assembly to a trailer harness spring and mounting bushing.

Referring to FIG. 2, the harness 26 is secured to the trailer frame 6 by first drilling a hole to accept the bushing 38. The conductor 22 is threaded through a bushing bore 40, and a lower end 42 of the bushing 38 is supported at a flange 44 in the drilled hole. The winding section 36 is fitted over an upper bushing end 46. Depending upon the diameter of the section 36, it can compress about the end 46 or be loosely fit to the end 46. A loop 48 of the section 36 flexibly radiates from the winding section 36 and receives a threaded fastener 50 to secure the bushing 38 and harness body 32 to the trailer frame 6. The length of the bushing sections 42 and 46 can be sized as desired.

With the mounting of the conductor 22 to a towing vehicle, the length of exposed conductor 22 and loop 28 is established upon doubling the conductor 22 back on itself and mounting the conductor 22 in the retainer 30. A gap 52 at the retainer 30 accepts the conductor 22 and the retainer 30 frictionally supports the conductor 22 to maintain the length of the loop 28. With any subsequent failure to release the connector 24 from a detached trailer, the loop provides slack, which can be released by the harness 26 to prevent stretching the wires.

The body 32 and bushing 38 are presently formed from a molded plastic, although a variety of other metal and composite materials may be used. A metal spring coated with a weather resistant material may also be used. Although a two section harness body 32 is shown, the body 32 can also be formed to a single diameter. The body 32 can also be constructed as a continuous tubular member versus a spiral wound member. The attachment loop 48 and retainer loop 30 might also be constructed as discrete assemblies which separately mount to the harness body 32.

Figure 3:
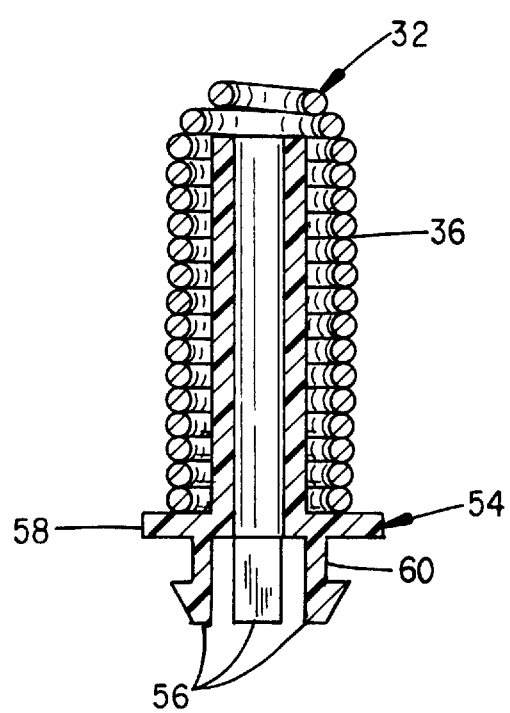
FIG. 3 is a section drawing through an alternative trailer harness.

With attention to FIG. 3, an alternative mounting is shown and wherein the harness body 32 is supported to a bushing 54. The bushing 54 is molded of a resilient material and provides a number of tangs 56 that depend below a flange 58. Upon inserting the tangs 56 into a prepared hole at the frame member 6, the tangs 56 flex and return to secure the bushing 54 to the frame member 6 at an annular groove 60. The harness 32 is secured to the bushing 54 by twisting the lower section 36 onto the bushing 54, where the harness body 32 is held by the compressive action of the section 36.

While the invention has been described with respect to a number of presently considered and preferred jig head constructions, it is to be appreciated still other constructions may be suggested to those skilled in the art upon reference hereto. The invention should therefore be construed to include all those equivalent embodiments within the spirit and scope of the following appended claims.

What is claimed is:

1. A conductor support harness comprising:
   a) a bushing having a bore; and
   b) a spiral wound harness body having a harness bore and mounted to said bushing, wherein said harness body includes first and second loops which radiate from the harness body, wherein the first loop fastens to a trailer frame and the second loop retains a looped length of conductor, whereby the harness body resiliently flexes to displace a terminal end of said conductor to an upright condition when disconnected from a towing vehicle.

2. A harness as set forth in claim 1 wherein said bushing comprises a tubular member having a flange which radially extends from the member.

3. A harness as set forth in claim 2 wherein said bushing includes a plurality of resilient tangs which project from one end of said bushing and flex to secure said bushing to an aperture at said trailer frame.

4. A harness as set forth in claim 1 wherein said harness body includes a plurality of sections of differing diameter.

5. A conductor support harness comprising:
   a) a bushing having a bore and including a plurality of flexible tangs which project from one end of said bushing and flex to secure said bushing to an aperture at a trailer frame; and
   b) a spiral wound harness body mounted to said bushing, wherein said harness body includes first and second loops which radiate from the harness body, wherein fastener means mount to the first loop to retain the harness body and said bushing to said trailer frame and the second loop retains a looped, length of a conductor to said harness body, whereby the harness body resiliently flexes to displace a terminal end of said conductor to an upright condition when disconnected from a towing vehicle.

6. A harness as set forth in claim 5 wherein said harness body includes a plurality of sections of differing diameter.

7. A conductor support harness comprising a resilient harness body having a bore, wherein said harness body includes first and second loops which radiate from the harness body, wherein fastener means mount to the first loop to retain the harness body to a trailer frame and the second loop retains a looped, length of a conductor to said harness body, whereby the harness body resiliently supports said conductor.

8. A harness as set forth in claim 7 wherein said harness body includes a plurality of sections of differing diameter.

9. A harness as set forth in claim 7 including a bushing having a bushing bore, wherein a plurality of resilient tangs project from one end of said bushing and flex to secure said bushing to an aperture at said trailer frame and wherein said harness body mounts to said bushing.

10. A conductor support harness comprising a resilient spiral wound harness body having a harness bore and mounted to a bushing in a trailer frame, wherein said harness body includes a first loop which radiates from the harness body, wherein the first loop fastens to the trailer frame, and wherein the harness body includes means at an elevated end for retaining a looped length of conductor to the harness body, whereby the harness body resiliently flexes to displace a terminal end of said conductor to an upright condition when disconnected from a towing vehicle.

11. A harness as set forth in claim 10 wherein said harness body includes a plurality of sections of differing diameter.

12. A harness as set forth in claim 10, wherein said bushing includes a flange which supports said bushing at an aperture in said trailer frame.

13. A harness as set forth in claim 10, wherein a plurality of resilient tangs project from one end of said bushing and flex to secure said bushing to an aperture at said trailer frame.

* * * * *